(12) United States Patent
Tonooka et al.

(10) Patent No.: US 7,225,691 B2
(45) Date of Patent: Jun. 5, 2007

(54) AIRBAG INFLATOR PERFORMANCE TEST SYSTEM

(75) Inventors: Daiei Tonooka, Wako (JP); Takeshi Kai, Wako (JP); Yoshihiko Morita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 235 days.

(21) Appl. No.: 11/146,703

(22) Filed: Jun. 7, 2005

(65) Prior Publication Data

US 2005/0274172 A1    Dec. 15, 2005

(51) Int. Cl.
*G01M 19/00* (2006.01)
*G01M 17/007* (2006.01)
*G01L 5/14* (2006.01)
*G01N 33/22* (2006.01)

(52) U.S. Cl. .................... 73/865.9; 73/35.14
(58) Field of Classification Search .... 73/35.14–35.17, 73/865.9, 1.08, 1.15
See application file for complete search history.

(56) References Cited

U.S. PATENT DOCUMENTS

| | | | | |
|---|---|---|---|---|
| 2,532,488 A | * | 12/1950 | Feneron | 340/584 |
| 2,543,732 A | * | 2/1951 | Shultz | 73/35.14 |
| 2,601,778 A | * | 7/1952 | Gordon | 73/35.14 |
| 2,917,927 A | * | 12/1959 | Clark | 73/865.6 |
| 5,351,988 A | * | 10/1994 | Bishop et al. | 280/737 |
| 5,531,098 A | * | 7/1996 | Bybee | 73/35.17 |
| 5,588,472 A | * | 12/1996 | Johnson | 141/83 |
| 5,929,348 A | * | 7/1999 | Stein et al. | 73/865.3 |
| 6,036,226 A | * | 3/2000 | Brown et al. | 280/736 |

FOREIGN PATENT DOCUMENTS

| | | |
|---|---|---|
| JP | 7-83800 | 3/1995 |
| JP | 2613752 | 2/1997 |

* cited by examiner

*Primary Examiner*—Thomas P. Noland
(74) *Attorney, Agent, or Firm*—Rankin, Hill, Porter & Clark LLP

(57) ABSTRACT

An airbag inflator performance test system includes: a cylindrical tank; a disk-shaped piston vertically movably disposed with a gap between the piston and an inner peripheral face of the tank, the gap allowing gas to flow; a piston rod that projects upward from the piston and runs slidably through the tank so as to guide vertical movement of the piston; a lower chamber defined within the tank beneath the piston; an upper chamber defined within the tank above the piston; an inflator disposed in the lower chamber; a pressure sensor for detecting a pressure of the upper chamber; and a piston displacement sensor for detecting a displacement of the piston in order to detect a volume in the upper chamber. After ignition of the inflator, an inflator local work and an inflator total work, which are indexes of the energy of the inflator, are calculated based on the pressure and the volume of the upper chamber.

3 Claims, 3 Drawing Sheets

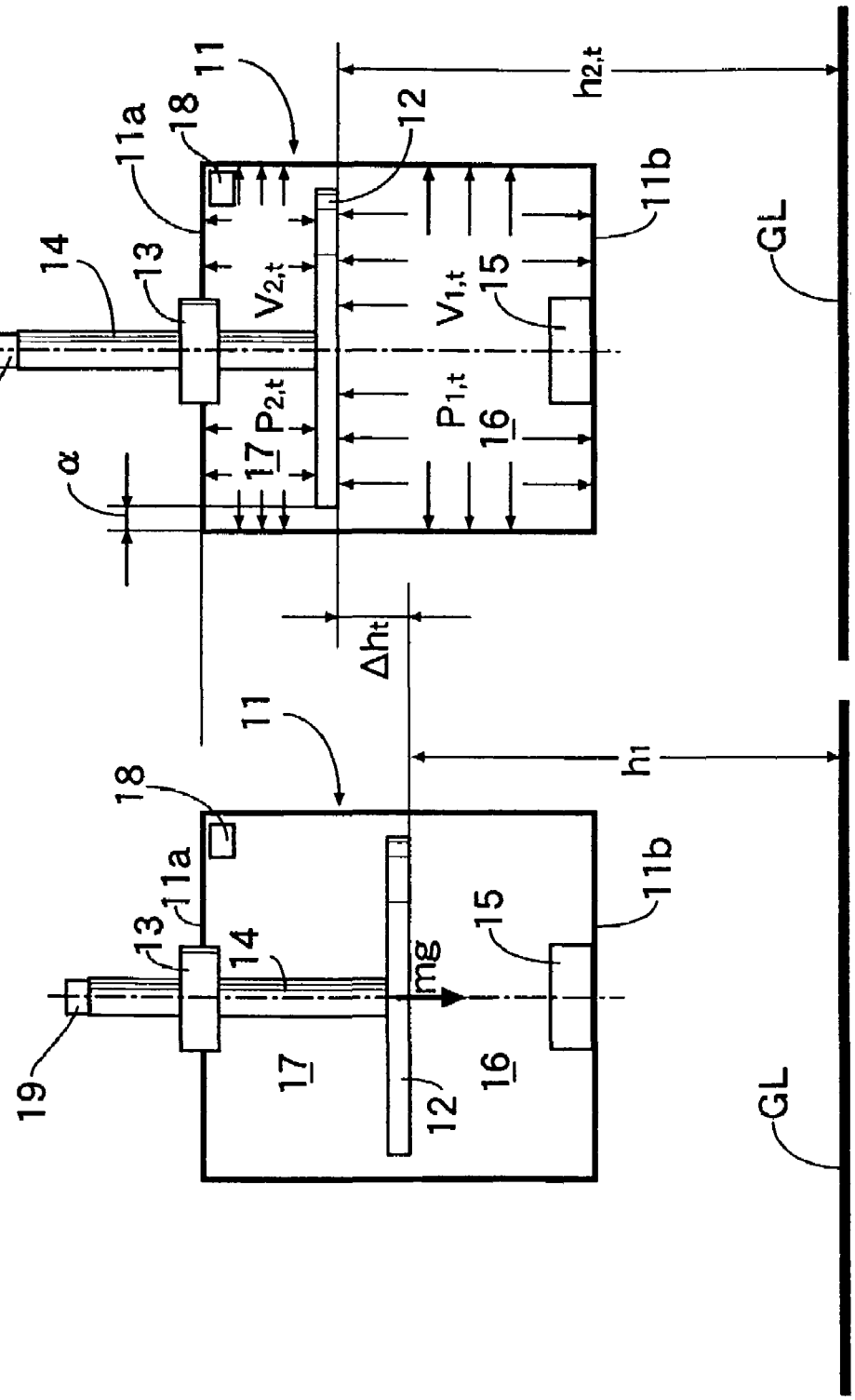

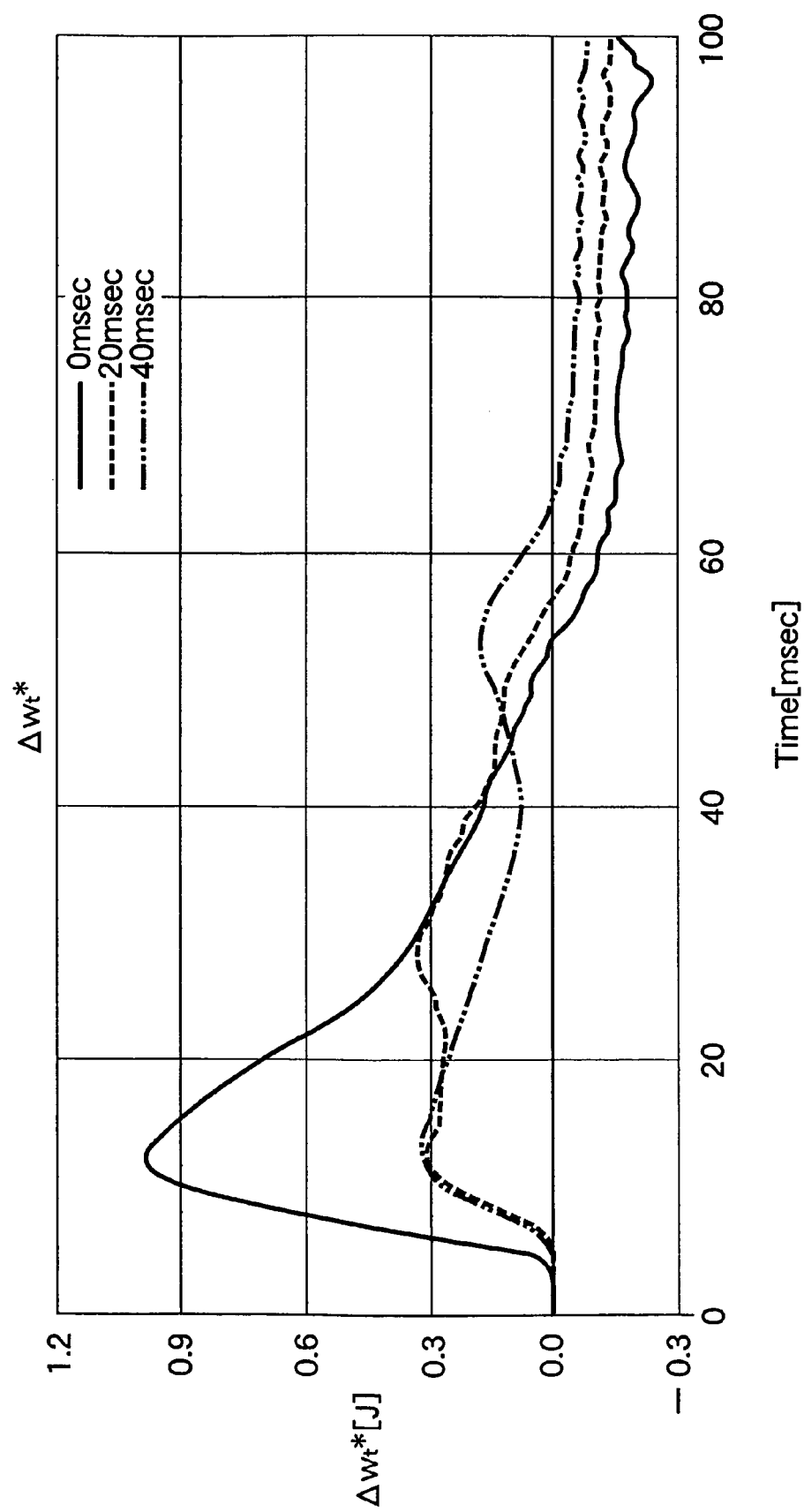

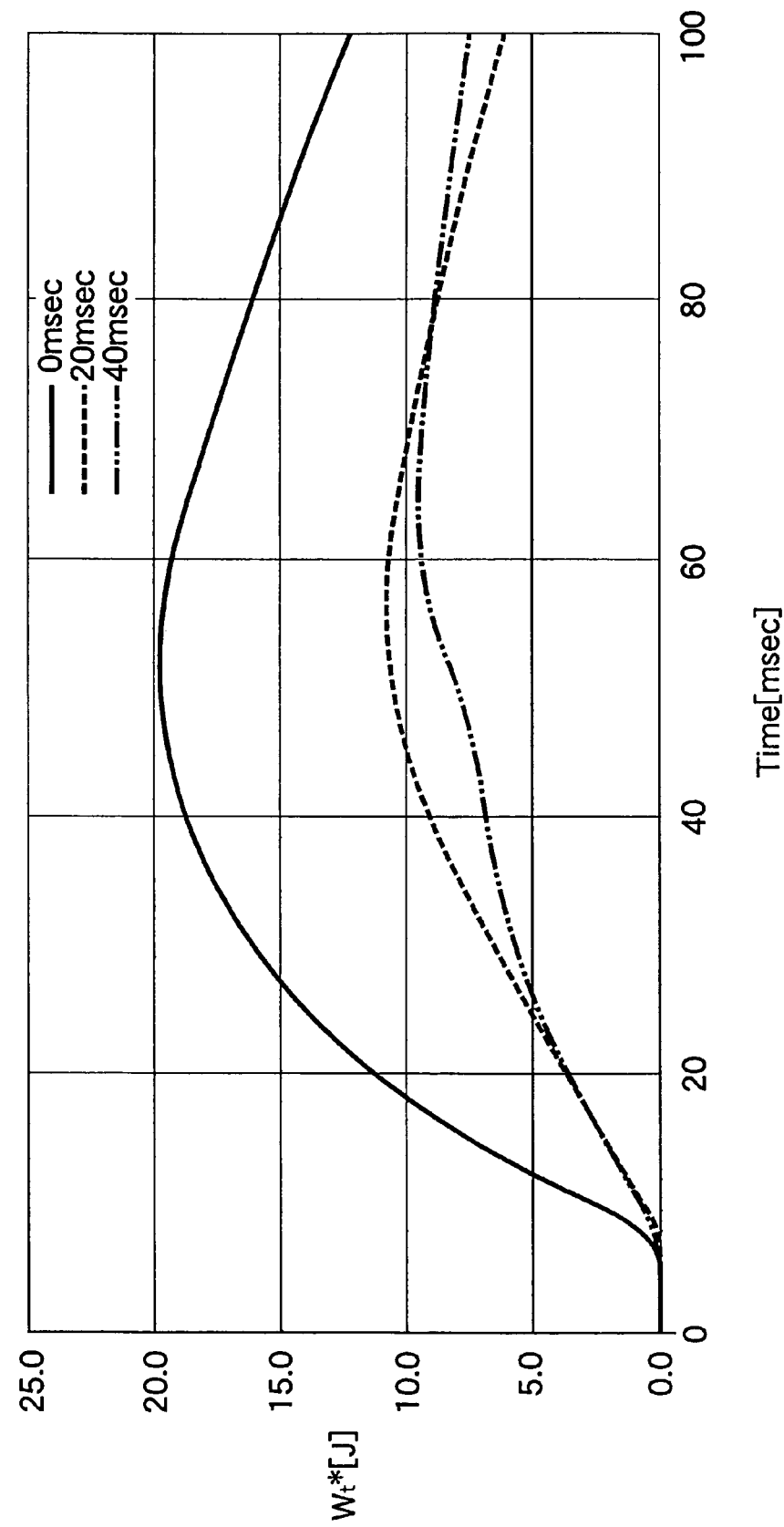

AIRBAG INFLATOR PERFORMANCE TEST SYSTEM

RELATED APPLICATION DATA

Japanese priority application No. 2004-175413, upon which the present application is based, is hereby incorporated in its entirety herein by reference.

BACKGROUND OF THE INVENTION

1. Field of the Invention

The present invention relates to a performance test system for an inflator that generates gas for deployment of an airbag for an automobile.

2. Description of the Related Art

A method is known from Japanese Patent Publication No. 2613752 in which, taking into consideration the fact that a nitrate ester based explosive is degraded and decomposes to generate nitrogen oxides, the degree of degradation is determined by measuring the rate of generation of nitrogen oxides from a nitrate ester based explosive by means of a gas sensor device employing, as a sensing film, a phthalocyanine whose electrical resistance changes as a result of adsorption of the nitrogen oxides.

Furthermore, a system is known from Japanese Patent Application Laid-open No. 7-83800 in which, in order to carry out an airbag deployment test without using an inflator that generates a gas by combustion of a propellant, the airbag is deployed by supplying a gas stored under pressure in a pressurized cylinder.

When testing the performance of a newly developed inflator or when testing the degree of degradation of a propellant of an inflator after time has elapsed since production the propellant, it is necessary to know how the energy of gas generated by the inflator changes over the time following ignition. However, since the inflator generates gas by combustion of the propellant in a very short period of time, such as about 100 msec, there is no conventional test system that can accurately follow the way in which the energy of the gas generated by the inflator changes in such a short period of time. Furthermore, even when the same inflator is tested, there is a concern that the test results might vary according to temperature conditions of a laboratory and the gas generated by the inflator. Thus, there has been a demand for development of a test system that can provide test results having high reproducibility regardless of the temperature conditions.

SUMMARY OF THE INVENTION

The present invention has been accomplished under the above-mentioned circumstances, and it is an object thereof to provide an airbag inflator performance test system that can test, with good reproducibility, the energy change characteristics of a gas generated by an inflator.

In order to achieve the above-mentioned object, according to a first feature of the invention, there is provided an airbag inflator performance test system comprising: a cylindrical tank having upper and lower portions closed by an upper wall and a lower wall; a disk-shaped piston vertically movably disposed with a gap between the piston and an inner peripheral face of the tank, the gap allowing gas to flow; a piston rod that projects upward from the piston and runs slidably through the upper wall of the tank so as to guide vertical movement of the piston; a lower chamber defined within the tank beneath the piston; an upper chamber defined within the tank above the piston; an inflator disposed in the lower chamber; a pressure sensor for detecting a pressure of the upper chamber; and a piston displacement sensor for detecting a displacement of the piston in order to detect a volume of the upper chamber, wherein, after ignition of the inflator, an inflator local work and an inflator total work, which are indexes of energy of the inflator, are calculated based on the pressure and the volume of the upper chamber.

According to a second feature of the present invention, in addition to the arrangement of the first feature, the inflator local work is an amount of energy generated by the inflator per unit time.

According to a third feature of the present invention, in addition to the arrangement of the first feature, the inflator total work is a total amount of energy generated during a predetermined time after the inflator is ignited.

With the arrangement of the first feature, the disk-shaped piston is vertically movably disposed with a gap between the piston and the inner peripheral face of the cylindrical tank, the gap allowing gas to flow; the inflator is disposed in the lower chamber defined within the tank beneath the piston; and there are also provided the pressure sensor for detecting the pressure of the upper chamber defined within the tank above the piston, and the piston displacement sensor for detecting the volume of the upper chamber from the displacement of the piston. Therefore, it is possible to test with good reproducibility the energy change characteristics of the gas generated by the inflator, by calculating, after ignition of the inflator, the inflator local work and the inflator total work which are indexes of the energy of the inflator, based on the pressure and the volume of the upper chamber.

With the arrangement of the second feature, the amount of energy generated by the inflator per unit time can be measured as the inflator local work, thereby facilitating check and regulation of the rate of deployment of an airbag.

With the arrangement of the third feature, since the total amount of energy generated during the predetermined time after the inflator is ignited can be measured as the inflator total work, thereby facilitating check and regulation of an excessive or insufficient output of the inflator relative to the volume of the airbag.

The above-mentioned object, other objects, characteristics, and advantages of the present invention will become apparent from an explanation of a preferred embodiment that will be described in detail below by reference to the attached drawings.

BRIEF DESCRIPTION OF THE DRAWINGS

FIG. 1 is a diagram for explaining the structure of an inflator performance test system according to one embodiment of the present invention.

FIG. 2 is a graph showing inflator local work.

FIG. 3 is a graph showing inflator total work.

DESCRIPTION OF PREFERRED EMBODIMENT

FIG. 1 shows a performance test system for testing the performance of an inflator that generates gas for deploying an airbag by combustion of a propellant. The system includes: a cylindrical tank 11 having upper and lower portions closed by an upper wall 11a and a lower wall 11b; a disk-shaped piston 12 vertically movably guided by the tank 11; and a piston rod 14 that projects upward from the center of the piston 12 and runs slidably through a bushing 13 that is provided in the upper wall 11a of the tank 11 and that has a low sliding resistance. The interior of the tank 11 is divided into a lower chamber 16 and an upper chamber 17 by the piston 12. An inflator 15 whose performance is to be tested is positioned at the center of the lower chamber 16. Furthermore, a small gap α is formed between the outer periphery of the piston 12 and the inner periphery of the tank 11, thus preventing sliding resistance from being generated between them and allowing gas to flow through the gap α.

The pressure of the upper chamber 17 of the tank 11 is detected by a pressure sensor 18, and the volume of the upper chamber 17 of the tank 11 is detected based on a displacement of the piston 12 (i.e., a displacement of the piston rod 14) detected by a piston displacement sensor 19.

The meanings of the symbols used in FIG. 1 are shown below. A subscript "$_t$" in the symbols means a physical quantity that changes with time.

$P_{1,t}$: pressure (Pa) of the lower chamber 16
$P_{2,t}$: pressure (Pa) of the upper chamber 17
$V_{1,t}$: volume (m$^3$) of the lower chamber 16
$V_{2,t}$: volume (m$^3$) of the upper chamber 17
$h_1$: height (m) from a ground line GL of a lower face of the piston 12 in an initial state
$h_{2,t}$: height (m) from the ground line GL of the lower face of the piston 12 after inflation
$\Delta h_t$: amount (m) of rise of the piston 12
m: mass (kg) of the piston 12
g: gravitational acceleration (m/sec$^2$)

Here, the "piston work" is defined as the work generated by the piston 12 moving upward due to an increase of the internal pressure of the lower chamber 16 of the tank 11 when gas is generated from the inflator 15. The "piston local work" is obtained as the sum of the internal energy increase of the system shown in FIG. 1 when heat transfer is ignored and the work that has been done by the system with respect to the exterior of the system (energy conservation law). The integration of this "piston local work" over time is the "piston total work".

The inventors of the present invention noted the work (piston work) generated by the piston 12 being raised against gravity due to an increase of the internal pressure of the tank 11 when the inflator 15 generates gas, and considered that an energy index of the inflator 15 could be expressed by using this piston work. As a result, the inventors defined a physical quantity as "inflator work" which is considered to correlate with the energy index of the inflator 15, and established a test equation representing the inflator work. The test equation for the inflator work is a gas state equation formed from a differential pressure and a differential volume resulting from the piston 12 rising, and theoretically expresses the temperature condition of the laboratory and the temperature of the gas generated by the inflator 15, leading to a high stability in obtaining identical experimental results.

A procedure for deriving the test equation is explained below.

(Equation 1)

$$\Delta w_t = P_{1,t} \cdot \Delta V_{1,t} - P_{2,t} \cdot \Delta V_{2,t} - mg \cdot \Delta h_t + \frac{1}{2} m \cdot \left(\frac{\Delta h_t}{\Delta t}\right)^2 \quad (1)$$

Equation (1) shows a piston local work $\Delta w_t$: the first and second terms on the right side express the work that the system carries out with respect to the exterior thereof; and the third and fourth terms, which consist of the potential energy and the kinetic energy respectively, express the increase in work within the system.

(Equation 2)

$$\sum_{t=0}^{N} \Delta w_t = W_t \quad (2)$$

$$= \sum_{t=0}^{N} \left\{ P_{1,t} \cdot \Delta V_{1,t} - P_{2,t} \cdot \Delta V_{2,t} - mg \cdot \Delta h_t + \frac{1}{2} m \cdot \left(\frac{\Delta h_t}{\Delta t}\right)^2 \right\}$$

Equation (2) shows a piston total work $W_t$, which is the integration of the piston local work $\Delta w_t$ obtained by Equation (1) from time t=0 to t=N.

The inflator work can be obtained by discrete of Equation (1).

(Equation 3)

$$\Delta w_t = P_{1,0} \cdot \Delta V_{1,0} + (\Delta P_{1,1} \cdot \Delta V_{1,1} + \Delta P_{1,2} \cdot \Delta V_{1,2} + \cdots + \Delta P_{1,t} \cdot \Delta V_{1,t}) - \quad (3)$$
$$P_{2,0} \cdot \Delta V_{2,0} - (\Delta P_{2,1} \cdot \Delta V_{2,1} + \Delta P_{2,2} \cdot \Delta V_{2,2} + \cdots + \Delta P_{2,t} \cdot \Delta V_{2,t}) -$$
$$mg \cdot \Delta h_t + \frac{1}{2} m \cdot \left(\frac{\Delta h_t}{\Delta t}\right)^2$$

Each of the terms forming the second and fourth terms on the right side of Equation (3) is inflator local work, and these terms forming the second and fourth terms can be respectively defined as in Equation (4) if it is assumed that the gas generated by the inflator 12 is an ideal gas.

(Equation 4)

$$\Delta P_{1,t} \cdot \Delta V_{1,t} \approx \Delta P_{2,t} \cdot \Delta V_{2,t} \quad (4)$$

By application of this assumed condition of Equation (4), an inflator local work $\Delta w_t^*$ and an inflator total work $W_t^*$ are obtained from Equation (5) and Equation (6), respectively.

(Equation 5)

$$\Delta w_t^* = \Delta P_{2,t} \cdot \Delta V_{2,t} \quad (5)$$

(Equation 6)

$$\sum_{t=0}^{N} \Delta w_t^* = W_t^* = \sum_{t=0}^{N} (\Delta P_{2,t} \cdot \Delta V_{2,t}) \quad (6)$$

The reason that the inflator work is obtained using the right side of Equation (4) is to reduce the compressibility effect of air present within the tank 11.

By generalizing Equation (5) and Equation (6) using a specific heat ratio k, Equation (7) and Equation (8) below are obtained.

(Equation 7)

$$\Delta w_{k,1}^* = \Delta P_{2,t} \cdot \Delta V_{2,t}^k \quad (7)$$

(Equation 8)

$$\sum_{t=0}^{N} \Delta w_{K,t}^* = W_{K,t}^* = \sum_{t=0}^{N} (\Delta P_{2,t} \cdot \Delta V_{2,t}^K) \quad (8)$$

It is convenient to use Equation (7) and Equation (8) when comparing inflators 15 that generate gases having different compositions.

The inflator local work $\Delta w_t^*$ given by Equation (5) or Equation (7) is defined as the energy of gas generated by the inflator 15 per unit time. The inflator total work $W_t^*$ given by Equation (6) or Equation (8) is defined as the total energy that the gas generated by the inflator 15 can give to the airbag over a predetermined period of time. The values of Equation (5) to Equation (8) can be calculated from the pressure $P_{2,t}$ of the upper chamber 17 of the tank 11 detected by the pressure sensor 18 and the volume $V_{2,t}$ of the upper chamber 17 of the tank 11 obtained from a displacement of the piston 12 detected by the piston displacement sensor 19.

As described above, since the test equation showing the inflator work given by Equation (5) to Equation (8) is a gas state equation formed from a differential pressure and a differential volume obtained by the piston 12 rising, it theoretically expresses the temperature condition of the laboratory and the temperature of the gas generated by the inflator 15, and thus it is considered that the stability is high in obtaining identical experimental results.

Results from carrying out a test on a dual ignition type inflator 15 using a performance test system which includes a tank 11 having a volume of 0.054 m³, are explained below by reference to FIG. 2 and FIG. 3.

FIG. 2 shows the inflator local work $\Delta w_t^*$ calculated based on Equation (5): the solid line shows the characteristics when a first stage ignition and a second stage ignition are simultaneously performed; the broken line shows the characteristics when the second stage ignition is performed 20 msec after the first stage ignition is performed; and the chain line shows the characteristics when the second stage ignition is performed 40 msec after the first stage ignition is performed.

In the simultaneous ignition characteristics (solid line), the inflator local work $\Delta w_t^*$ rose rapidly as compared with the 20 msec delay ignition characteristics (broken line) and the 40 msec delay ignition characteristics (chain line), but $\Delta w_t^*$ started to decrease at a relatively early stage. It was observed that $\Delta w_t^*$ coincided until 20 msec elapsed after the first stage ignition was performed, in the 20 msec delay ignition characteristics and the 40 msec delay ignition characteristics; and thereafter $\Delta w_t^*$ increased 20 msec after the first stage ignition was performed, in the 20 msec delay ignition characteristics, and $\Delta w_t^*$ increased 40 msec after the first stage ignition was performed, in the 40 msec delay ignition characteristics. In this way, the validity of Equation (5) was proved from the test results shown in FIG. 2.

FIG. 3 shows the inflator total work $W_t^*$ calculated based on Equation (6): the solid line shows the characteristics when the first stage ignition and the second stage ignition are simultaneously performed; the broken line shows the characteristics when the second stage ignition is performed 20 msec after the first stage ignition is performed; and the chain line shows the characteristics when the second stage ignition is performed 40 msec after the first stage ignition is performed.

With regard also to this inflator total work $W_t^*$, the same characteristics as those of the above-mentioned inflator local work $\Delta w_t^*$ were observed, and thus the validity of Equation (6) was proved.

In particular, calculating the inflator local work $\Delta w_t^*$ which is defined as the energy of gas generated by the inflator 15 per unit time, facilitates check and regulation of the rate of deployment of the airbag. Furthermore, calculating the inflator total work $W_t^*$ which is defined as the total energy that the gas generated by the inflator 15 can give to the airbag during a predetermined period of time, facilitates check and regulation of an excessive or insufficient output of the inflator 15 relative to the volume of the airbag.

Although an embodiment of the present invention has been described in detail above, the present invention can be modified in a variety of ways without departing from the subject matter of the present invention.

What is claimed is:

1. An airbag inflator performance test system comprising:
 a cylindrical tank having upper and lower portions closed by an upper wall and a lower wall;
 a disk-shaped piston vertically movably disposed with a gap between the piston and an inner peripheral face of the tank, the gap allowing gas to flow;
 a piston rod that projects upward from the piston and runs slidably through the upper wall of the tank so as to guide vertical movement of the piston;
 a lower chamber defined within the tank beneath the piston;
 an upper chamber defined within the tank above the piston;
 an inflator disposed in the lower chamber;
 a pressure sensor for detecting a pressure of the upper chamber; and
 a piston displacement sensor for detecting a displacement of the piston in order to detect a volume of the upper chamber,
 wherein, after ignition of the inflator, an inflator local work and an inflator total work, which are indexes of energy of the inflator, are calculated based on the pressure and the volume of the upper chamber.

2. The airbag inflator performance test system according to claim 1, wherein the inflator local work is an amount of energy generated by the inflator per unit time.

3. The airbag inflator performance test system according to claim 1, wherein the inflator total work is a total amount of energy generated during a predetermined time after the inflator is ignited.

* * * * *

UNITED STATES PATENT AND TRADEMARK OFFICE
CERTIFICATE OF CORRECTION

PATENT NO. : 7,225,691 B2  Page 1 of 1
APPLICATION NO. : 11/146703
DATED : June 5, 2007
INVENTOR(S) : Tonooka et al.

It is certified that error appears in the above-identified patent and that said Letters Patent is hereby corrected as shown below:

On the Title Page, After Section [65], insert --[30] Foreign Priority Data, June 14, 2004, (JP)....2004-175413--.

Signed and Sealed this

Thirty-first Day of July, 2007

JON W. DUDAS
*Director of the United States Patent and Trademark Office*